US 9,071,183 B2

(12) United States Patent
Becerra et al.

(10) Patent No.: US 9,071,183 B2
(45) Date of Patent: Jun. 30, 2015

(54) METHODS AND SYSTEMS FOR PROVIDING COMBINED BLOWER MOTOR AND DRAFT INDUCER MOTOR CONTROL

(75) Inventors: Roger Carlos Becerra, Fort Wayne, IN (US); Ludovic Andre Chretien, Columbia City, IN (US)

(73) Assignee: Regal Beloit America, Inc., Beloit, WI (US)

(*) Notice: Subject to any disclaimer, the term of this patent is extended or adjusted under 35 U.S.C. 154(b) by 990 days.

(21) Appl. No.: 13/117,568

(22) Filed: May 27, 2011

(65) Prior Publication Data
US 2012/0297819 A1    Nov. 29, 2012

(51) Int. Cl.
G05B 11/28    (2006.01)
H02P 5/74    (2006.01)

(52) U.S. Cl.
CPC .......................................... *H02P 5/74* (2013.01)

(58) Field of Classification Search
USPC ................. 318/599, 600, 625, 34, 51, 55, 50, 318/400.01, 400.04; 62/6, 498, 504, 505, 62/508
See application file for complete search history.

(56) References Cited

U.S. PATENT DOCUMENTS

| | | | |
|---|---|---|---|
| 4,707,646 A * | 11/1987 | Thompson et al. | 388/816 |
| 5,006,744 A * | 4/1991 | Archer et al. | 310/89 |
| 5,159,218 A * | 10/1992 | Murry et al. | 310/68 B |
| 5,327,064 A * | 7/1994 | Arakawa et al. | 318/801 |
| 5,410,230 A * | 4/1995 | Bessler et al. | 318/471 |
| 6,121,747 A * | 9/2000 | Trachtenberg | 318/800 |
| 6,423,118 B1 | 7/2002 | Becerra et al. | |
| 6,895,176 B2 | 5/2005 | Archer et al. | |
| 7,106,019 B2 | 9/2006 | Becerra et al. | |
| 7,332,842 B2 * | 2/2008 | Kasahara et al. | 310/84 |
| 7,466,089 B2 | 12/2008 | Beifus | |
| 7,573,217 B2 | 8/2009 | Solan, Jr. et al. | |
| 7,843,157 B2 | 11/2010 | Archer et al. | |
| 8,115,458 B2 * | 2/2012 | Kamata et al. | 323/207 |
| 8,234,879 B2 * | 8/2012 | Hwang et al. | 62/228.1 |
| 2007/0013325 A1 * | 1/2007 | Kiuchi et al. | 318/34 |

* cited by examiner

*Primary Examiner* — Bentsu Ro
*Assistant Examiner* — Thai Dinh
(74) *Attorney, Agent, or Firm* — Armstrong Teasdale LLP

(57) ABSTRACT

A control system is described that includes a first rotating machine, a second rotating machine, and a motor controller physically mounted to and communicatively coupled with the first rotating machine and communicatively coupled with the second rotating machine. The motor controller includes a first PWM generator operable to generate a first set of pulse width modulated signals for application to the first rotating machine, and a second PWM generator operable to generate a second set of pulse modulated signals for application to the second rotating machine.

22 Claims, 7 Drawing Sheets

METHODS AND SYSTEMS FOR PROVIDING COMBINED BLOWER MOTOR AND DRAFT INDUCER MOTOR CONTROL

BACKGROUND OF THE INVENTION

The field of the invention relates generally to electronically controlled motors, and more specifically, to methods and systems for providing combined blower motor and draft inducer motor control.

In a conventional furnace, natural convection currents move air through the exhaust outlet of the furnace's combustion chamber to carry away exhaust gases. The moving air further induces a draft in the combustion chamber for mixing oxygen with the fuel being burned in the chamber. Heat energy remaining in the exhaust gases, however, is lost to the atmosphere which decreases the overall efficiency of the furnace. The use of heat exchangers improves furnace efficiency by extracting additional heat from the exhaust gases before they are vented to the atmosphere. Extracting heat from the exhaust gases, however, reduces the natural convection currents which would otherwise carry the gases away. One solution has been to use a draft inducing fan to force the exhaust gases into the atmosphere. The draft inducing fan is run by a motor. Such a motor is referred to herein as a draft inducer motor.

In certain conventional furnace applications, fan (draft inducer motor) speed is controlled, and it is known to control motor speed as a function of sensed pressure. In other furnace applications, it is known to control this motor speed by sensing ignition in the combustion chamber, since combustion decreases the density of the combustion chamber gases moved by the draft inducer fan which can also affect speed/torque of the draft inducer motor and fan combination. Finally, different furnaces that incorporate draft inducer motors have different restrictions to air flow and require the draft inducer motor to operate at different speeds and/or torques to produce the desired pressure in the combustion chamber.

Most conventional furnaces comprise what are referred to as forced air systems and operate by forcing heated (or cooled) air through a duct system. The motor that forces the air through the duct system is generally referred to as a blower motor. Air flow through this "indoor section" of a heating, ventilating and/or air conditioning (HVAC) system generally determines several key performance characteristics of such a system, including, but not limited to, total system capacity for cooling and dehumidification, latent system capacity for dehumidification, overall efficiency (capacity/input power), and indoor sound level. Variations in the rate of air flow caused by a blower motor can cause these performance characteristics to vary differently. As such, systems exist to control the speed of blower motors.

However, most conventional systems provide only a single air flow rate for cooling and another for heating. Even in systems having a multispeed induction motors, the installer often selects one of the speed taps to operate the motor at single speeds for cooling or heating. More advanced HVAC systems may provide variable speed motors but require a separate controller, such as a humidistat, to switch motor speed.

Electronically controlled variable speed motors (VSMs), including electronically commutated motors (ECMs) and induction motors are generally used in air handling applications in HVAC systems, for both the draft inducer application and the blower motor application. As such, controllers are utilized for each of these motors.

BRIEF DESCRIPTION OF THE INVENTION

In one aspect, a control system is provided that includes a first rotating machine, a second rotating machine, and a motor controller physically mounted to and communicatively coupled with the first rotating machine and communicatively coupled with the second rotating machine. The motor controller includes a first PWM generator operable to generate a first set of pulse width modulated signals for application to the first rotating machine, and a second PWM generator operable to generate a second set of pulse modulated signals for application to the second rotating machine.

In another aspect, a furnace is provided that includes a first rotating machine operable as a portion of a blower, a second rotating machine operable as a portion of a draft inducer, and a motor controller physically mounted to and communicatively coupled with the first rotating machine, the motor controller communicatively coupled with the second rotating machine. The motor controller includes a first PWM generator operable to generate a first set of pulse width modulated signals for application to the first rotating machine such that the first rotating machine is operable to drive a blower, and a second PWM generator operable to generate a second set of pulse modulated signals for application to the second rotating machine such that the second rotating machine is operable to drive a draft inducer.

In still another aspect, a method for controlling a first rotating machine for operation as a blower and a second rotating machine for operation as a draft inducer is provided. The method includes generating, within a common motor controller physically mounted to the first rotating machine, a first set of pulse width modulated signals, the signals having characteristics such that they operate the first rotating machine in a manner consistent with blower operation, generating, within the common motor controller, a second set of pulse width modulated signals, the signals having characteristics such that they operate the second rotating machine in a manner consistent with draft inducer operation, and applying the first set of pulse width modulated signals and the second set of pulse width modulated signals to the corresponding rotating machines.

In yet another aspect, a motor including a chassis, an electrical connector extending from the chassis, a first rotating machine coupled to the chassis operable as a portion of a blower, and a motor controller coupled to the first rotating machine and housed within the chassis is provided. The motor controller includes a first PWM generator operable to generate a first set of pulse width modulated signals for application to the first rotating machine such that the first rotating machine is operable to drive a blower, and a second PWM generator operable to generate a second set of pulse modulated signals for output via the electrical connector for application to a second rotating machine such that the second rotating machine is operable to drive a draft inducer.

In another aspect, an outdoor unit for a heating, ventilation and air conditioning (HVAC) system is provided. The outdoor unit includes a compressor, a first rotating machine coupled to the compressor, a condenser, a second rotating machine coupled to the condenser, and a motor controller physically mounted to and communicatively coupled with the first rotating machine, the motor controller communicatively coupled with the second rotating machine. The motor controller includes a first PWM generator operable to generate a first set of pulse width modulated signals for application to the first rotating machine such that the first rotating machine is operable to drive the compressor, and a second PWM generator operable to generate a second set of pulse modulated signals for application to the second rotating machine such that the second rotating machine is operable to drive the condenser.

In still another aspect, a method for controlling a first rotating machine for operation of a compressor and a second rotating machine for operation of a condenser is provided. The method includes generating, within a common motor controller physically mounted to the first rotating machine, a first set of pulse width modulated signals, the signals having characteristics such that they operate the first rotating machine in a manner consistent with compressor operation, generating, within the common motor controller, a second set of pulse width modulated signals, the signals having characteristics such that they operate the second rotating machine in a manner consistent with condenser operation, and applying the first set of pulse width modulated signals and the second set of pulse width modulated signals to the corresponding rotating machines.

In yet another aspect, a motor is provided that includes a chassis, an electrical connector extending from the chassis, a shaft extending from the chassis operable for physical attachment to a compressor of a heating, ventilation and air conditioning (HVAC) system, a first rotating machine within the chassis and coupled to the shaft, and a motor controller communicatively coupled to the first rotating machine and housed within the chassis. The motor controller includes a first PWM generator operable to generate a first set of pulse width modulated signals for application to the first rotating machine such that the first rotating machine is rotated in a manner consistent with compressor operation, and a second PWM generator operable to generate a second set of pulse modulated signals for output via the electrical connector for application to a second rotating machine such that the second rotating machine is rotated in a manner consistent with condenser operation.

DETAILED DESCRIPTION OF THE INVENTION

Figure 1:
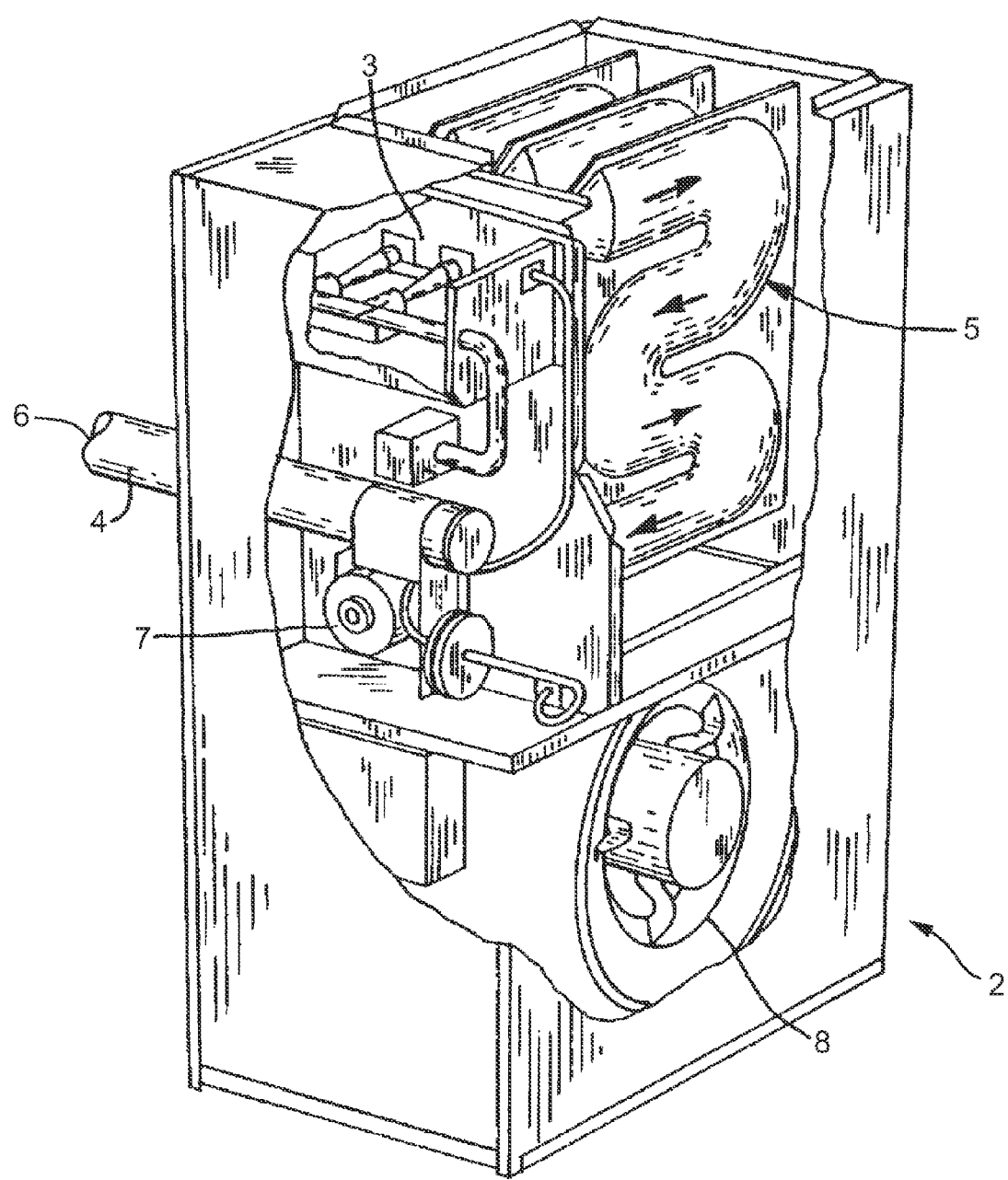
FIG. 1 illustrates one embodiment of a furnace.

FIG. 1 illustrates one embodiment of a furnace 2. Included within furnace 2 are a combustion chamber 3, exhaust outlet 4, and a heat exchanger assembly 5. A draft inducing fan (not shown in FIG. 1) is positioned at the discharge end of heat exchanger assembly 5 or, in the alternative, at an inlet to combustion chamber 3, to induce a draft in combustion chamber 3 for moving exhaust combustion chamber gases through exhaust outlet 6. The draft inducing fan is driven by motor 7. The moving gases establish a pressure drop across heat exchanger assembly 5 which forces furnace exhaust from combustion chamber 3 through heat exchanger assembly 5.

In the illustrated embodiment, a blower 8, driven by a blower motor (not shown in FIG. 1) moves air across heat exchanger assembly 5 for conditioning the air. The conditioned air gains heat from the exhaust combustion chamber gases before the blower 8 discharges the heated air from furnace 2. Generally, blower 8 forces the conditioned air through a duct system, leading to the descriptive term "forced air system".

Figure 2:
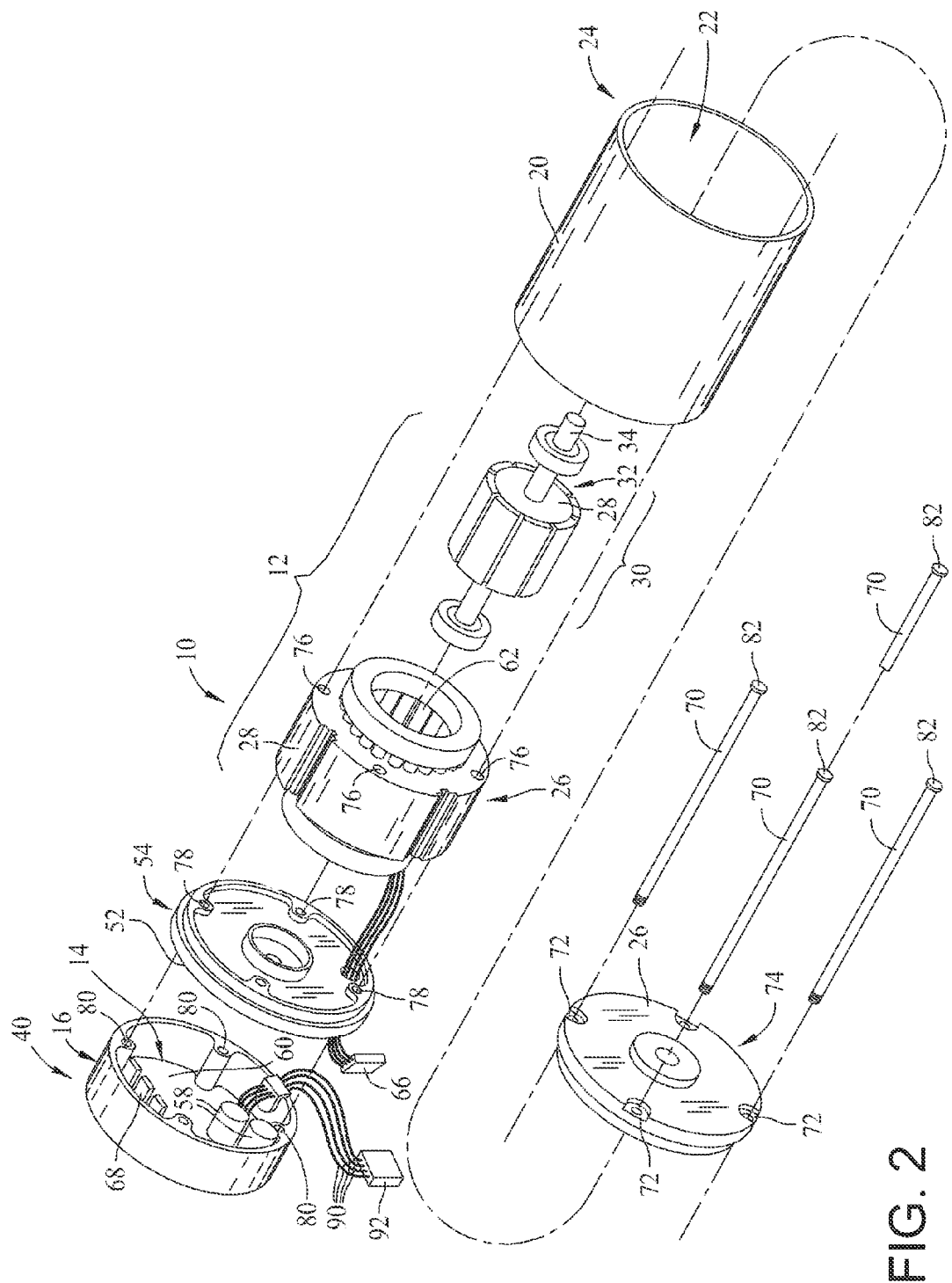
FIG. 2 is an exploded view of an electronically controlled variable speed motor.
Figure 3:
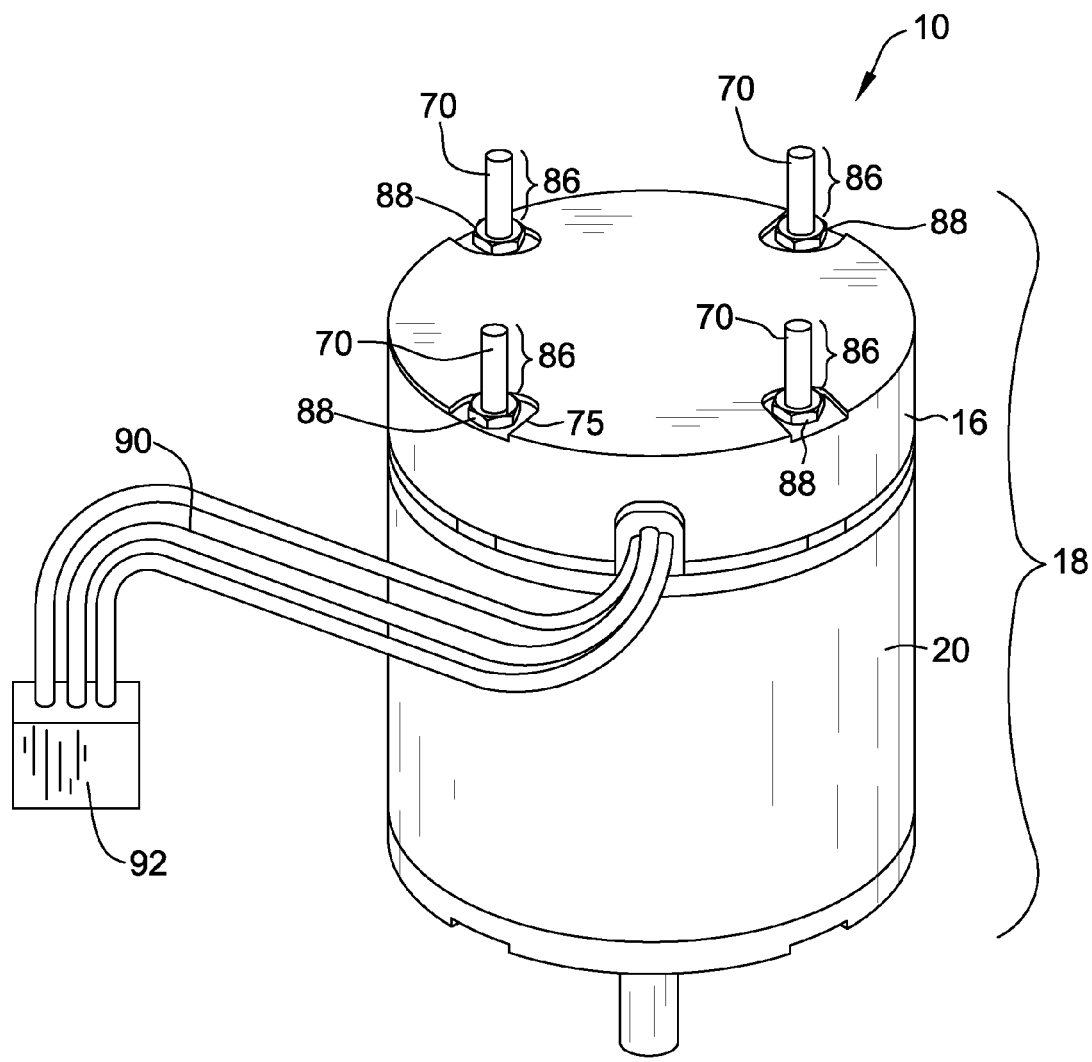
FIG. 3 is a fully assembled view of the motor of FIG. 2.

As described above, both the draft inducing motor and the blower motor may be electronically controlled variable speed motors. FIG. 2 is an exploded view of such a motor, specifically an integrated induction motor and motor controller assembly 10, also referred to herein as motor assembly 10. FIG. 3 illustrates the fully assembled motor assembly 10. Motor assembly 10 includes an induction motor 12 and a motor control unit 14, also referred to herein as motor controller 14. Motor controller 14 is configured to be positioned at least partially within an end cap 16. A motor assembly housing includes end cap 16 and a housing shell 20. Housing shell 20 defines an interior 22 and an exterior 24 of motor assembly 10 and is configured to at least partially enclose and protect motor assembly 10. Motor 12 includes a stationary assembly 26 including a stator or core 28 and a rotatable assembly 30 including a permanent magnet rotor 32 and a shaft 34. A fan (not shown) or other device to be driven such as means for moving air through an air handling system engages shaft 34. In the exemplary embodiment, motor assembly 10 is included within an air handling system. For example, one embodiment of motor assembly 10 may be coupled to a fan for blowing air over cooling coils and/or a heat exchanger assembly and would be referred to as a blower motor. Another embodiment of motor assembly 10, smaller in size and air moving capacity might be utilized as a draft inducing motor.

Referring again to FIGS. 2 and 3, end cap 16 is mounted on a rear portion 40 of motor assembly 10 to enclose motor controller 14 at least partially within end cap 16. Motor controller 14 is positioned adjacent an outer side 52 of a first end member 54. Motor controller 14 includes a plurality of electronic components 58 and a connector 68 mounted on a component board 60, for example, a printed circuit board. Motor controller 14 is connected to winding stages 62 of stationary assembly 26 by interconnecting a winding end turn connector 66 and a motor control unit connector 68. Motor controller 14 applies a voltage to one or more of winding stages 62 at a time for commutating winding stages 62 in a preselected sequence to rotate rotatable assembly 30 about an axis of rotation.

Connecting elements 70, for example, a plurality of bolts, pass through bolt openings 72 in a second end member 74, bolt openings 76 in core 28, bolt openings 78 in first end member 54, and bolt openings 80 in end cap 16. Heads 82 of connecting elements 70 engage the second end member 74. Connecting elements 70 are adapted to urge second end member 74 and end cap 16 toward each other, thereby supporting first end member 54, stationary assembly 26, and rotatable assembly 30 therebetween. Additionally, housing shell 20 may be positioned between first end member 54 and second end member 74 for enclosing and protecting stationary assembly 26 and rotatable assembly 30.

Although described as including induction motor 12, integrated induction motor and motor control unit assembly 10 may include any suitable type of electric motor including, but not limited to, induction motor 12, a brushless direct current (BLDC) motor, an electronically commutated motor (ECM), a brushless alternating current (BLAC) motor, or a stepper motor.

As described above, FIG. 3 illustrates motor assembly 10 in a fully assembled state. Connecting elements 70 pass through second end member 74, stationary assembly 26, first end member 54, and end cap 16. Connecting elements 70 have a portion 86 which projects laterally from end cap 16. Portion 86 is adapted to engage a support structure (not shown) for supporting the motor assembly 10. Connecting elements 70 may be secured in place by placing a nut 88 engaging the threads on each of portions 86 of connecting elements 70. A wiring harness 90 and a connector 92 are utilized to connect motor assembly 10 to an electrical power source, such as a source of pulse width modulated signals.

Figure 4A:
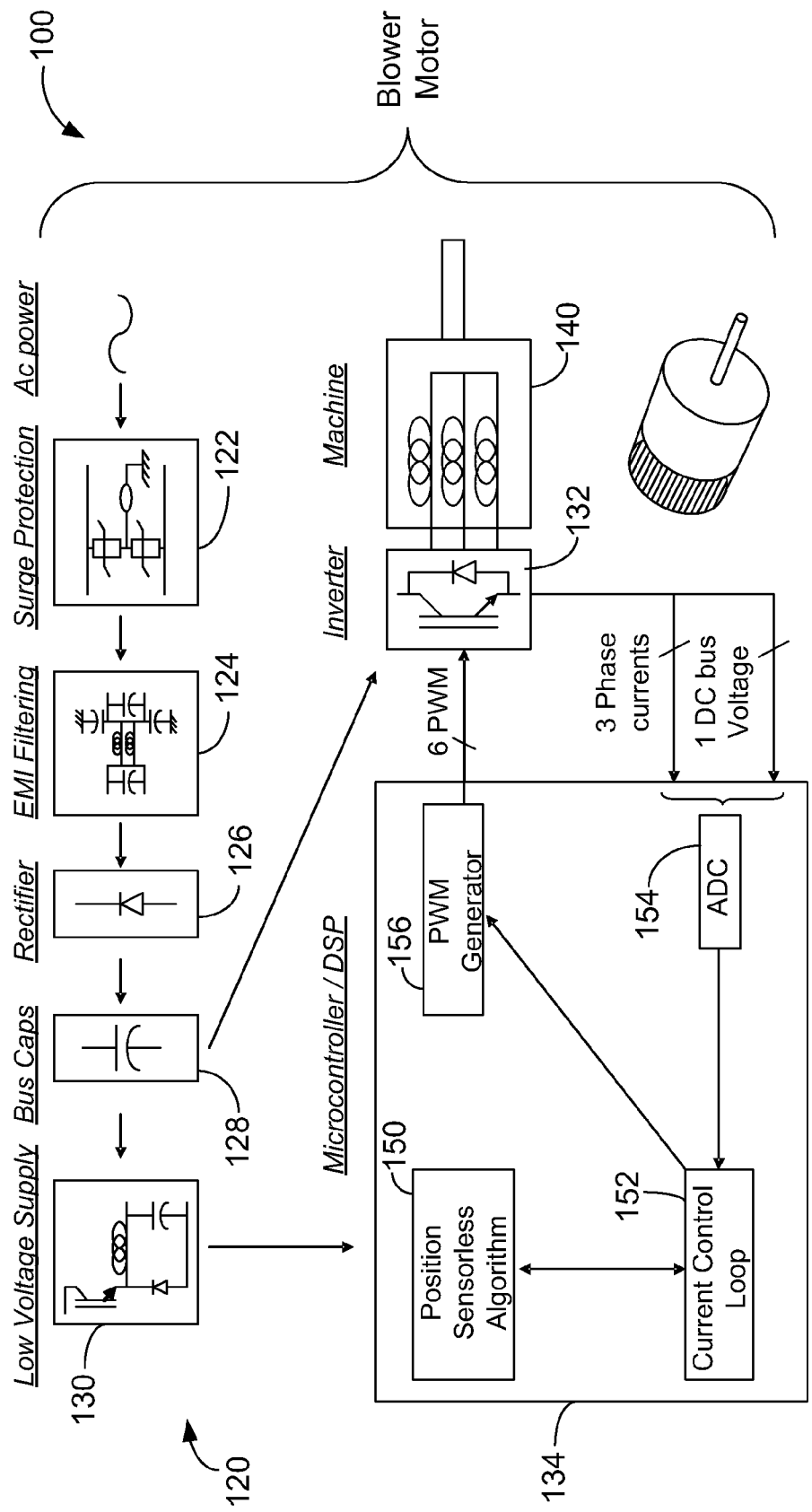
FIGS. 4A and 4B are functional diagrams of the electronically controlled motors generally utilized in a furnace application, including a blower motor and a draft inducer motor.
Figure 4B:
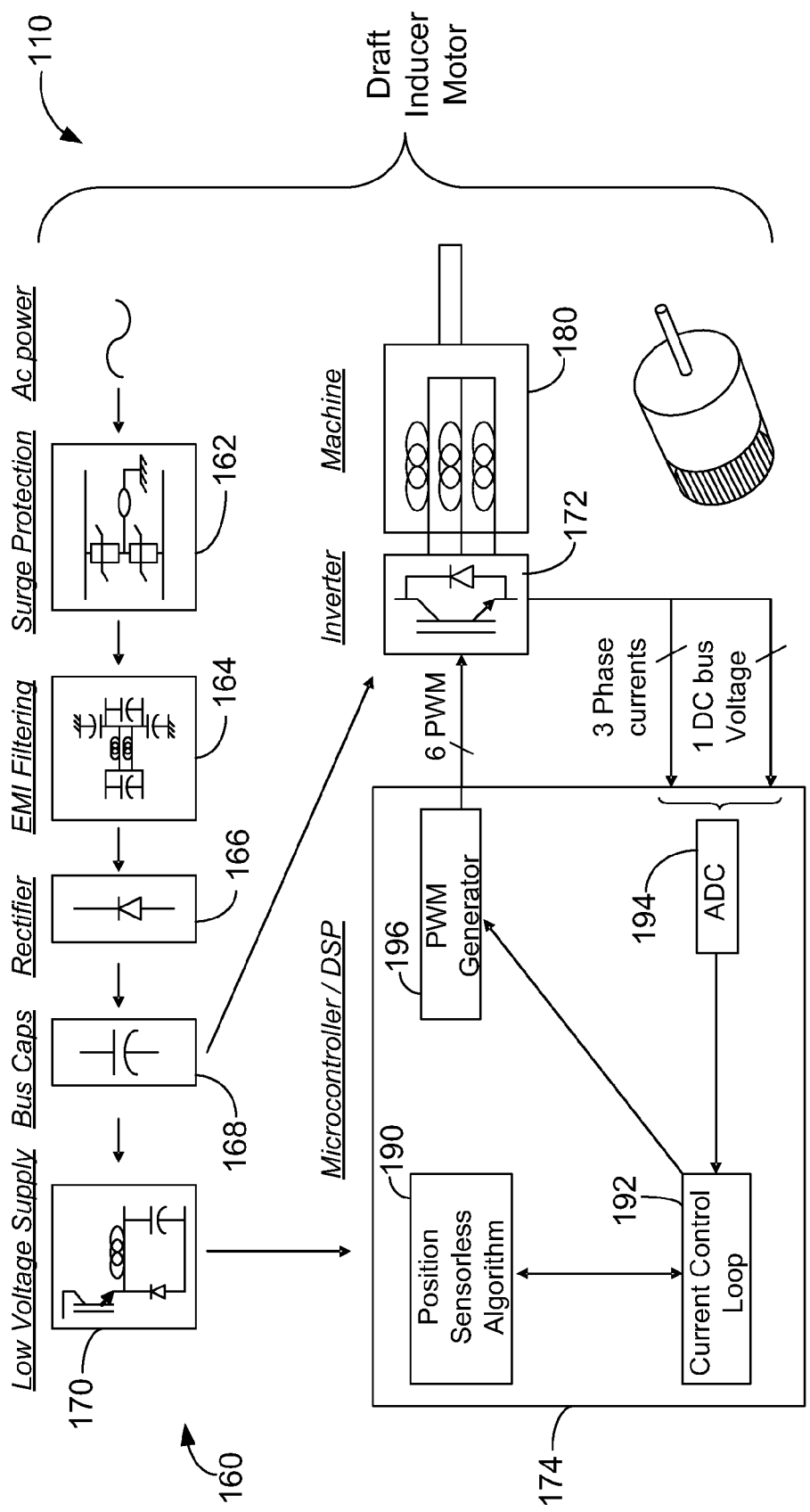

FIGS. 4A and 4B are respective functional diagrams of the electronically controlled motors generally utilized in a furnace application, including a blower motor 100 (FIG. 4A) and a draft inducer motor 110 (FIG. 4B). Similar to the motor described with respect to FIGS. 2 and 3, motors 100 and 110 are electronically controlled. Specifically, motor 100 includes a motor controller 120 that include a surge protection device 122 and electromagnetic interference filtering 124 for filtering any anomalies in regard to incoming AC power. The signals output from electromagnetic interference filtering 124 are applied to a rectifier 126 and capacitance 128 to generate a smoothed DC voltage which is applied to a low voltage supply 130 and inverter 132. An output of the low voltage supply 130 is utilized at least for supplying power to a processing unit 134, which may sometimes be referred to as a microcontroller/DSP. Programmed to control operation of the rotating machine 140 portion of motor 100, processing unit 132 may include circuits operable to perform a positioning algorithm 150, current control loop 152, analog to digital conversion 154, and pulse-width modulated signal generation 156. As known, six pulse width modulated signals are utilized to induce rotation of the rotating machine 140, via inverter 132 which allows motor 100 to be referred to as a three-phase motor. Signals received from the rotating machine 140 at processing unit 134 include signals relating to the current drawn by each of the phases and a DC bus voltage. Such signals are applied to the ADC 154 which in turn provides data to current control loop 152 which accomplishes feedback control of motor operation. Embodiments of motor 100 are known and are currently utilized as blower motors in HVAC applications.

Similarly, motor 110 includes a motor controller 160 that include a surge protection device 162 and electromagnetic interference filtering 164 for filtering any anomalies in regard to incoming AC power. The signals output from electromagnetic interference filtering 164 are applied to a rectifier 166 and capacitance 168 to generate a smoothed DC voltage which is applied to a low voltage supply 170 and inverter 172. An output of the low voltage supply 170 is utilized at least for supplying power to a processing unit 174, which may sometimes be referred to as a microcontroller/DSP. Programmed to control operation of the rotating machine 180 portion of motor 110, processing unit 172 may include circuits operable to perform a positioning algorithm 190, current control loop 192, analog to digital conversion 194, and pulse-width modulated signal generation 196. As known, six pulse width modulated signals are utilized to induce rotation of the rotating machine 180, via inverter 172 which allows motor 110 to be referred to as a three-phase motor. Signals received from the rotating machine 180 at processing unit 174 include signals relating to the current drawn by each of the phases and a DC bus voltage. Such signals are applied to the ADC 194 which in turn provides data to current control loop 192 which accomplishes feedback control of motor operation. Embodiments of motor 110 are known and are currently utilized as draft inducer motors in HVAC applications.

Blower motor 100 and draft inducer motor 110 operate in much the same manner, from a motor operation perspective, though the motors are different in size, scale, and end use function. In a furnace application, the motors 100 and 110 may operate at different times, and may operate using different parameters that are programmed into the respective processing functions 134 and 174. From review of FIGS. 4A and 4B it is determined that motor controllers 120 and 160 include many similar components, and while certain of the components of motor controller 160 are likely not of a size and scale for operation of rotating machine 140, the components of motor controller 120 are of a size and scale for operation of rotating machine 180, as such machines only draw the current necessary for their operation.

Figure 5:
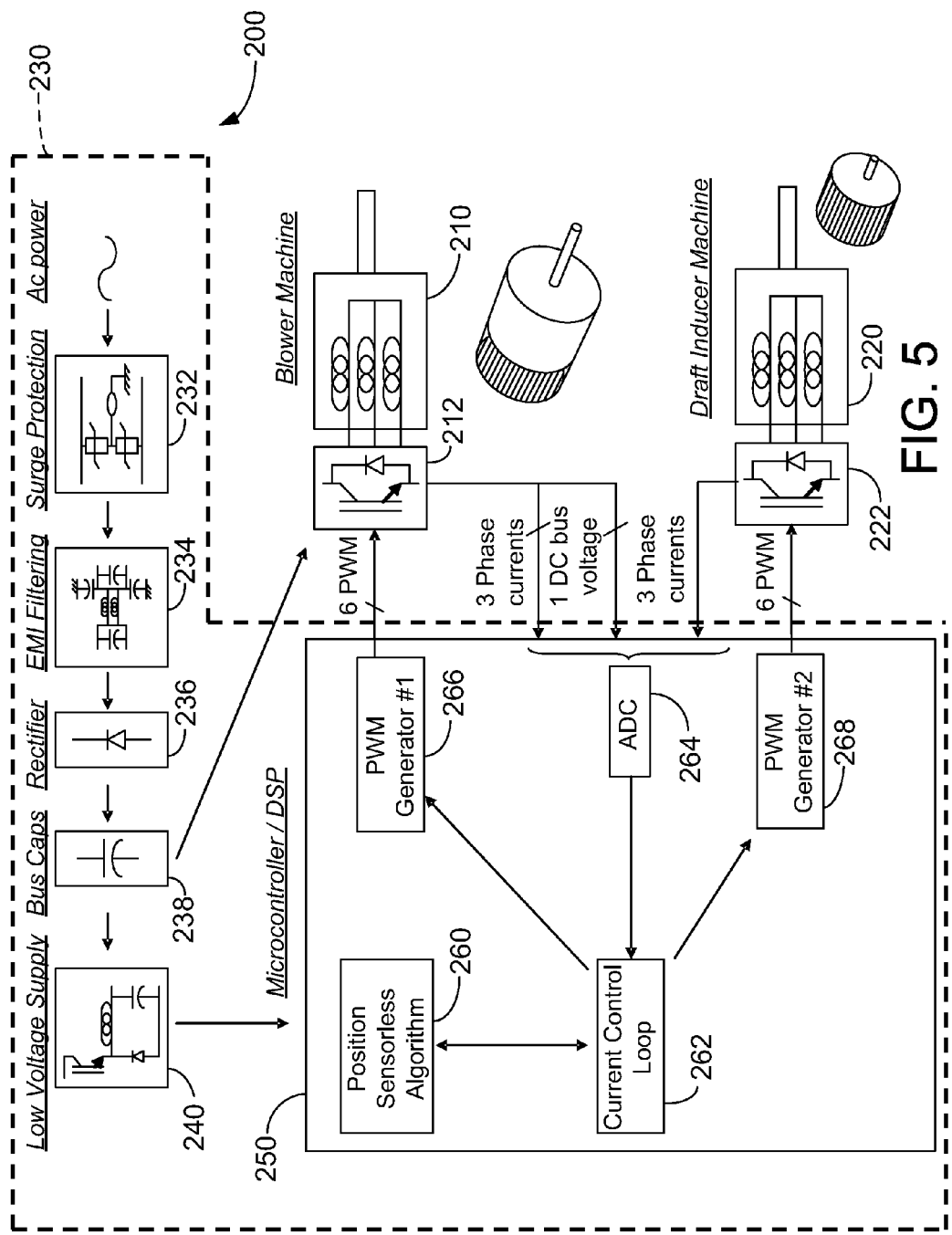
FIG. 5 is a functional diagram of a rotating machine and controller for a blower motor, the controller further configured to control operation of a rotating machine operable as a draft inducer.

Therefore, FIG. 5 is a functional diagram of a motor system 200 for a furnace, or similar, application. Motor system 200 includes a first rotating machine 210 and inverter 212, a second rotating machine 220 and inverter 222, and a common motor controller 230. Common motor controller 230 includes a surge protection device 232 and electromagnetic interference filtering 234 for filtering any anomalies in regard to incoming AC power. The signals output from electromagnetic interference filtering 234 are applied to a rectifier 236 and capacitance 238 to generate a smoothed DC voltage which is applied to a low voltage supply 240 and inverters 212 and 222. An output of the low voltage supply 240 is utilized at least for supplying power to a dual processing unit 250, which may sometimes be referred to as a microcontroller/DSP. Programmed to control operation of both rotating machines 210 and 220 of motor system 200, processing unit 250 may include circuits operable to perform a positioning algorithm 260, current control 262, analog to digital conversion 264, pulse-width modulated signal generation 266 specific to rotating machine 210, and pulse-width modulated signal generation 268 specific to rotating machine 220.

Pulse-width modulated signal generation 266 and 268 each generate the six pulse width modulated signals that are utilized to induce rotation of the respective rotating machines 210 and 220, via respective inverters 212 and 222 at varying speeds according to parameters of the PWM signals received at the respective rotating machines. Signals received from the respective rotating machines 210 and 220 are received at processing unit 250 and include signals relating to the current drawn by each of the phases of each of the rotating machines as well as a DC bus voltage. Within processing unit 250, switching is provided such that the ADC 264 is capable of providing current data to current control loop 262 for each of the rotating machines.

As is readily apparent to those of skill in the art, the second PWM generator 268 and increased ADC capacity of ADC 264 may be accomplished with minimal additional circuitry, and operation of the multiple rotating units is further accomplished through programming that is stored and executed within processing unit 250. However, the additional circuitry and programming is accomplished at a reduced cost over the functional duplication of motor controllers 120 and 160. It is therefore contemplated that common motor controller 230 could be expanded to provide control for more than two rotating machines.

Figure 6:
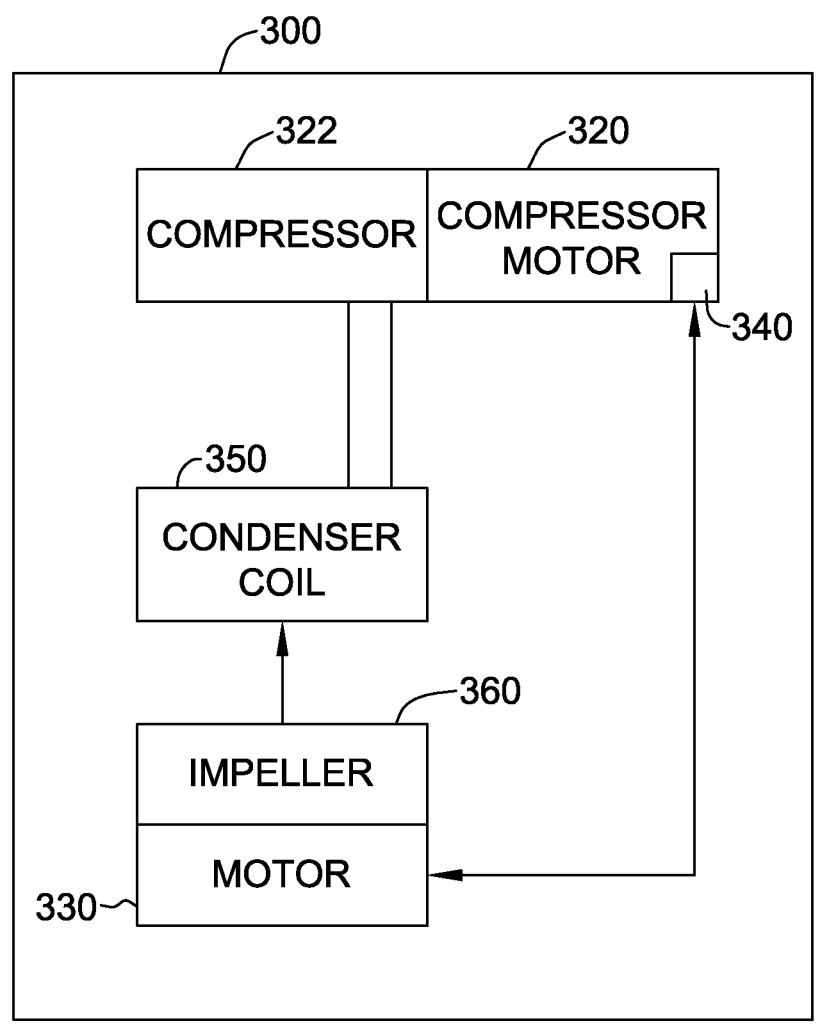
FIG. 6 is a block diagram of an air conditioning which incorporates a controller on a compressor motor that is also operable for controlling a condenser motor.

FIG. 6 is a block diagram of an air conditioning unit 300 such as a portion of a residential heating, ventilation, and air-conditioning (HVAC) system positioned outside of a structure, (e.g., a house, a building, a warehouse, etc.) that is to be cooled. An air conditioning unit 300 typically includes two electric motors, for example, a compressor motor 320 and a condenser motor 330. Compressor motor 320 incorporates a controller 340 physically located thereon that is also operable for controlling operation of condenser motor 330.

Compressor motor 320 compresses a refrigerant using compressor 322, causing the temperature of the refrigerant to rise. The hot refrigerant gas is provided to a condenser coil 350. Condenser motor 330 turns an impeller 360 to circulate air across the condenser coil 350, reducing the temperature of the refrigerant within the condenser coil 350.

Both the compressor motor 320 and the condenser motor 330 may be electronically controlled variable speed motors. Those skilled in the art will appreciate that the embodiments described above with respect to FIGS. 4A, 4B, and 5 may be applied to the two motors of an outdoor air conditioning unit or other multiple motor unit in much the same manner as applied to the furnace unit of FIG. 1.

Pulse-width modulated signal generation components as described above each generate the pulse width modulated signals that are utilized to induce rotation of compressor motor 320 for operation of compressor 322 and rotation of condenser motor 330 for operation of impeller 360 at varying speeds according to parameters of the PWM signals received at the respective rotating machines. Signals received from the respective rotating machines of compressor motor 320 and condenser motor 330 are received at a processing unit and include signals relating to the current drawn by each of the phases of each of the rotating machines as well as a DC bus voltage. Within a processing unit, switching is provided such that an ADC such as ADC 264 is capable of providing current data to current control loop for each of the rotating machines.

The described embodiments provide a cost savings to the manufacturer and ultimately to the consumer as redundant motor control circuits are eliminated from a multiple rotating machine system. Further, reliability of such systems increase as there are fewer components within the system. Simply, the described embodiments take advantage of advances in computing power to provide a cost effective solution to the HVAC and other industries, namely a single computer to control two rotating machines.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A control system comprising:
    a first rotating machine;
    a second rotating machine; and
    a motor controller physically mounted to and communicatively coupled with said first rotating machine, said motor controller communicatively coupled with said second rotating machine, said motor controller comprising:
        a first pulse width modulation (PWM) generator operable to generate a first set of pulse width modulated signals for application to said first rotating machine;
        a second PWM generator operable to generate a second set of pulse modulated signals for application to said second rotating machine, wherein the first set of pulse width modulated signals is different than the second set of pulse modulated signals; and
        an analog-to-digital converter (ADC) configured to receive signals from each of said first rotating machine and said second rotating machine, the signals including at least a direct current (DC) bus voltage drawn by each of said first rotating machine and said second rotating machine.

2. The control system according to claim 1 wherein said motor controller comprises a current control loop communicatively coupled to said ADC, said ADC configured to output signals to said current control loop, said motor controller programmed to utilize a first output of said current control loop to generate the first set of pulse modulated signals for application to said first rotating machine and a second output of said current control loop to generate the second set of pulse modulated signals to separately control operation of said second rotating machine.

3. The control system according to claim 1 wherein at least one of said first PWM generator and said second PWM generator are operable to generate a set of pulse width modulated signals for application to a three phase rotating machine.

4. The control system according to claim 1 wherein said motor controller is packaged within a chassis of one of said first rotating machine and said second rotating machine.

5. A furnace comprising:
    a first rotating machine operable as a portion of a blower;
    a second rotating machine operable as a portion of a draft inducer; and
    a motor controller physically mounted to and communicatively coupled with said first rotating machine, said motor controller communicatively coupled with said second rotating machine, said motor controller comprising:
        a first pulse width modulation (PWM) generator operable to generate a first set of pulse width modulated signals for application to said first rotating machine such that said first rotating machine is operable to drive the blower;
        a second PWM generator operable to generate a second set of pulse modulated signals for application to said second rotating machine such that said second rotating machine is operable to drive a draft inducer, wherein the first set of pulse width modulated signals is different than the second set of pulse modulated signals; and
        an analog-to-digital converter (ADC) configured to receive signals from each of said first rotating machine and said second rotating machine, the signals including at least a direct current (DC) bus voltage drawn by each of said first rotating machine and said second rotating machine.

6. The furnace according to claim 5 wherein said motor controller comprises a current control loop communicatively coupled to said ADC, said ADC configured to output signals to said current control loop, said motor controller programmed to:
    utilize a first output of said current control loop to operate said first PWM generator such that said first PWM generator generates the first set of pulse modulated signals of the type that facilitate operation of said first rotating machine for use as a blower; and
    utilize a second output of said current control loop to operate said second PWM generator such that said second PWM generator generates the second set of pulse modulated signals of the type that facilitate operation of said second rotating machine for use as a draft inducer.

7. The furnace according to claim 5 wherein at least one of said first PWM generator and said second PWM generator are operable to generate a set of pulse width modulated signals for application to a three phase rotating machine.

8. A method for controlling a first rotating machine for operation as a blower and a second rotating machine for operation as a draft inducer, said method comprising:

generating, within a common motor controller physically mounted to the first rotating machine, a first set of pulse width modulated signals, the signals having characteristics such that they operate the first rotating machine in a manner consistent with blower operation;

generating, within the common motor controller, a second set of pulse width modulated signals, the signals having characteristics such that they operate the second rotating machine in a manner consistent with draft inducer operation, wherein the first set of pulse width modulated signals is different than the second set of pulse modulated signals;

receiving signals indicative of at least a direct current (DC) bus voltage drawn by each of the first rotating machine and the second rotating machine at an analog-to-digital converter (ADC); and applying the first set of pulse width modulated signals and the second set of pulse width modulated signals to the corresponding rotating machines.

9. The method according to claim 8 further comprising:

receiving signals indicative of current draw of the first rotating machine at the ADC;

utilizing signals from the ADC, the signals based on the current draw of the first rotating machine, to control characteristics of the first set of pulse width modulated signals, such that operation of the first rotating machine is controlled;

receiving signals indicative of current draw of the second rotating machine at the ADC; and utilizing signals from the ADC, the signals based on the current draw of the second rotating machine, to control characteristics of the second set of pulse width modulated signals, such that operation of the second rotating machine is controlled.

10. The method according to claim 9 further comprising providing a switching function operable to:

apply the signals indicative of current draw of the first rotating machine to the ADC for a first time period; and apply the signals indicative of current draw of the second rotating machine to the ADC for a second time period.

11. A motor comprising:

a housing;

an electrical connector extending from said housing;

a first rotating machine coupled to said housing operable as a portion of a blower;

a motor controller coupled to said first rotating machine and housed within said housing, said motor controller comprising:

a first pulse width modulation (PWM) generator operable to generate a first set of pulse width modulated signals for application to said first rotating machine such that said first rotating machine is operable to drive the blower;

a second PWM generator operable to generate a second set of pulse modulated signals for application to a second rotating machine such that the second rotating machine is operable to drive a draft inducer, wherein the first set of pulse width modulated signals is different than the second set of pulse modulated signals; and an analog-to-digital converter (ADC) configured to receive signals from each of said first rotating machine and said second rotating machine, the signals including at least a direct current (DC) bus voltage drawn by each of said first rotating machine and said second rotating machine.

12. The motor according to claim 11 wherein:

said motor controller configured to receive signals indicative of current draw of the first rotating machine at said ADC and utilize signals from said ADC, the signals based on the current draw of the first rotating machine, to control characteristics of the first set of pulse width modulated signals, such that operation of the first rotating machine is controlled; and said electrical connector is configured to route signals received from the second rotating machine to the ADC, the received signals indicative of current draw of the second rotating machine and utilizing signals from the ADC, the signals based on the current draw of the second rotating machine, to control characteristics of the second set of pulse width modulated signals output via said electrical connector, such that operation of the second rotating machine is controlled.

13. An outdoor unit for a heating, ventilation and air conditioning (HVAC) system, said outdoor unit comprising:

a compressor;

a first rotating machine coupled to said compressor;

a condenser;

a second rotating machine coupled to said condenser; and a motor controller physically mounted to and communicatively coupled with said first rotating machine, said motor controller communicatively coupled with said second rotating machine, said motor controller comprising:

a first pulse width modulation (PWM) generator operable to generate a first set of pulse width modulated signals for application to said first rotating machine such that said first rotating machine is operable to drive said compressor;

a second PWM generator operable to generate a second set of pulse modulated signals for application to said second rotating machine such that said second rotating machine is operable to drive said condenser, wherein the first set of pulse width modulated signals is different than the second set of pulse modulated signals; and an analog-to-digital converter (ADC) configured to receive signals from each of said first rotating machine and said second rotating machine, the signals including at least a direct current (DC) bus voltage drawn by each of said first rotating machine and said second rotating machine.

14. The furnace according to claim 13 wherein said motor controller comprises a current control loop communicatively coupled to said ADC, said ADC configured to output signals to said current control loop, said motor controller programmed to:

utilize a first output of said current control loop to operate said first PWM generator such that said first PWM generator generates a set of pulse modulated signals of the type that facilitate operation of said first rotating machine for the driving of said compressor; and utilize a second output of said current control loop to operate said second PWM generator such that said second PWM generator generates a set of pulse modulated signals of the type that facilitate operation of said second rotating machine for the driving of said condenser.

15. The furnace according to claim 13 wherein at least one of said first rotating machine and said second rotating machine comprises a three-phase rotating machine, and wherein at least one of said first PWM generator and said second PWM generator are operable to generate a set of pulse width modulated signals for application to a corresponding said three phase rotating machine.

16. A method for controlling a first rotating machine for operation of a compressor and a second rotating machine for operation of a condenser, said method comprising:
generating, within a common motor controller physically mounted to the first rotating machine, a first set of pulse width modulated signals, the signals having characteristics such that they operate the first rotating machine in a manner consistent with compressor operation;
generating, within the common motor controller, a second set of pulse width modulated signals, the signals having characteristics such that they operate the second rotating machine in a manner consistent with condenser operation, wherein the first set of pulse width modulated signals is different than the second set of pulse modulated signals;
receiving signals indicative of at least a direct current (DC) bus voltage drawn by each of the first rotating machine and the second rotating machine at an analog-to-digital converter (ADC); and
applying the first set of pulse width modulated signals and the second set of pulse width modulated signals to the corresponding rotating machines.

17. The method according to claim 16 further comprising:
receiving signals indicative of current draw of the first rotating machine at the ADC;
utilizing signals from the ADC, the signals based on the current draw of the first rotating machine, to control characteristics of the first set of pulse width modulated signals, such that operation of the first rotating machine is controlled;
receiving signals indicative of current draw of the second rotating machine at the ADC; and
utilizing signals from the ADC, the signals based on the current draw of the second rotating machine, to control characteristics of the second set of pulse width modulated signals, such that operation of the second rotating machine is controlled.

18. The method according to claim 17 further comprising providing a switching function operable to:
apply the signals indicative of current draw of the first rotating machine to the ADC for a first time period; and
apply the signals indicative of current draw of the second rotating machine to the ADC for a second time period.

19. A motor comprising:
a housing;
an electrical connector extending from said housing;
a shaft extending from said housing operable for physical attachment to a compressor of a heating, ventilation and air conditioning (HVAC) system;
a first rotating machine within said housing and coupled to said shaft;
a motor controller communicatively coupled to said first rotating machine and housed within said housing, said motor controller comprising:
a first pulse width modulation (PWM) generator operable to generate a first set of pulse width modulated signals for application to said first rotating machine such that said first rotating machine is rotated in a manner consistent with compressor operation;
a second PWM generator operable to generate a second set of pulse modulated signals for application to a second rotating machine such that the second rotating machine is rotated in a manner consistent with condenser operation, wherein the first set of pulse width modulated signals is different than the second set of pulse modulated signals; and
an analog-to-digital converter (ADC) configured to receive signals from each of said first rotating machine and said second rotating machine, the signals including at least a direct current (DC) bus voltage drawn by each of said first rotating machine and said second rotating machine.

20. The motor according to claim 19 wherein:
said motor controller configured to receive signals indicative of current draw of the first rotating machine at said ADC and utilize signals from said ADC, the signals based on the current draw of the first rotating machine, to control characteristics of the first set of pulse width modulated signals, such that operation of the first rotating machine is controlled; and
said electrical connector is configured to route signals received from the second rotating machine to the ADC, the received signals indicative of current draw of the second rotating machine and utilizing signals from the ADC, the signals based on the current draw of the second rotating machine, to control characteristics of the second set of pulse width modulated signals output via said electrical connector, such that operation of the second rotating machine is controlled.

21. A rotating machine system comprising:
a first rotating machine;
a motor controller communicatively coupled to said first rotating machine, said motor controller operable to:
generate a first set of pulse width modulated signals for application to said first rotating machine;
generate a second set of pulse width modulated signals for application to a second rotating machine, wherein the first set of pulse width modulated signals is different than the second set of pulse width modulated signals; and
an analog-to-digital converter (ADC) configured to receive signals from each of said first rotating machine and said second rotating machine, the signals including at least a direct current (DC) bus voltage drawn by each of said first rotating machine and said second rotating machine.

22. The rotating machine system according to claim 21 wherein said first rotating machine is operable to drive one of a blower, a draft inducer, a compressor, and a condenser.

* * * * *